(No Model.)
J. B. ENNIS.
CULTIVATOR.
No. 280,021. Patented June 26, 1883.
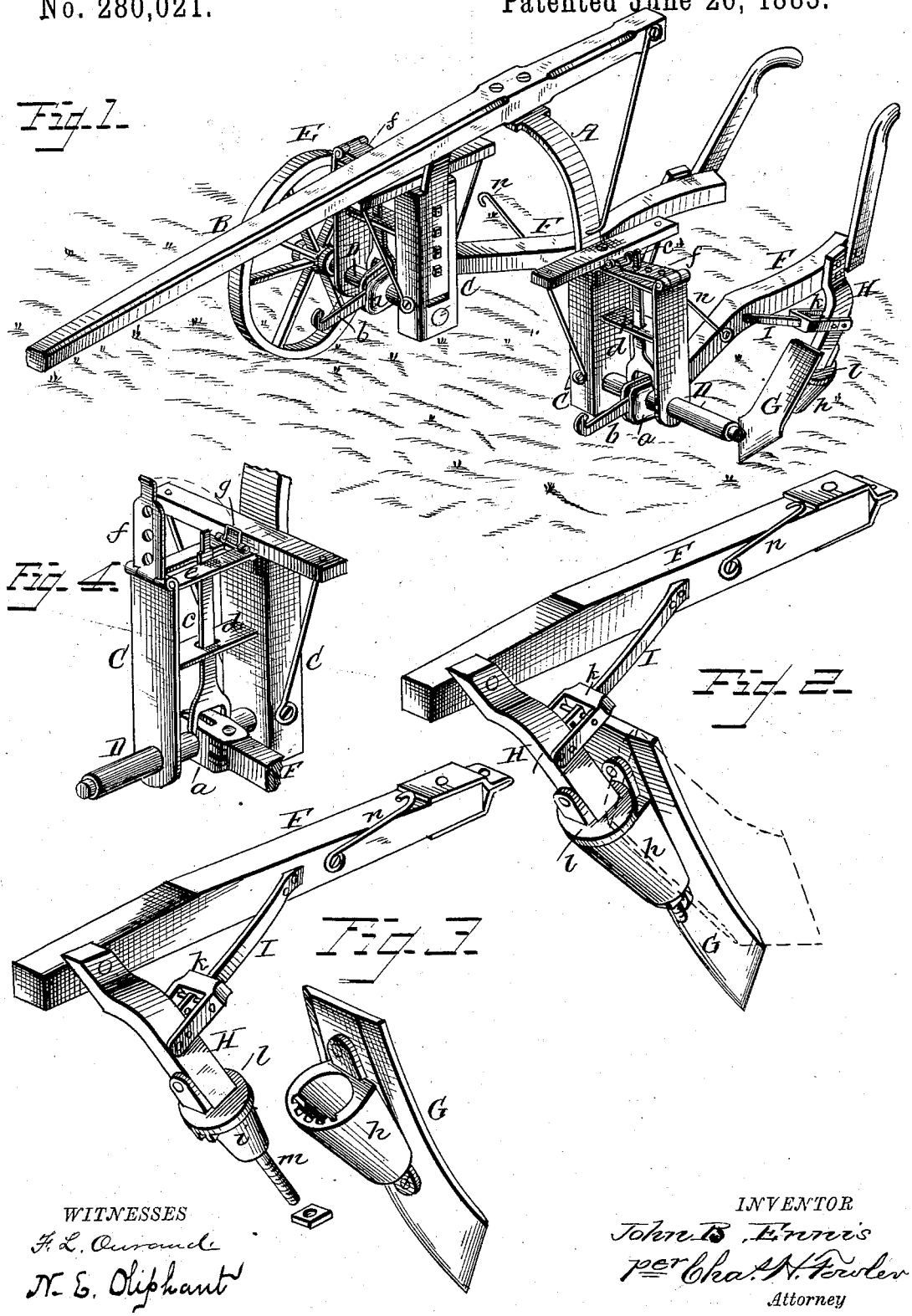
WITNESSES
F. L. Ourand
N. E. Oliphant
INVENTOR
John B. Ennis
per Chas. H. Fowler
Attorney

UNITED STATES PATENT OFFICE.

JOHN B. ENNIS, OF OTTUMWA, IOWA.

CULTIVATOR.

SPECIFICATION forming part of Letters Patent No. 280,021, dated June 26, 1883.

Application filed February 16, 1883. (No model.)

*To all whom it may concern:*

Be it known that I, JOHN B. ENNIS, a citizen of the United States, residing at Ottumwa, in the county of Wapello and State of Iowa, have invented certain new and useful Improvements in Corn-Cultivators; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, an enlarged view of one of the beams with plow or shovel attached; Fig. 3, a similar view with the parts detached; Fig. 4, a detail view of one of the beam-frames.

This invention relates to certain new and useful improvements in adjustable cultivators, the object thereof being to produce such an implement as will be simple in its construction, effective in its operation, and at the same time admit of the ready adjustment of the plows or shovels to or from the line of plants, said plows or shovels being also readily adjusted upon their standards to throw the dirt either toward or away from said plants, as the operator may find necessary, according to the nature of the ground or the prevalence of weeds. These objects I attain by the construction substantially as shown in the accompanying drawings, and hereinafter described.

In the accompanying drawings, A represents an arch-shaped support for the tongue B, said support having its ends adjustably secured to suitable beam-frames C, in order to accommodate it to the height of the plants over which it passes.

Supported by the frames C are the axles D of the wheels E, said axles having connected thereto sliding boxes $a$, to which are pivotally connected the plow or shovel beams F, the single-tree hooks $b$ being also connected to the axles and sliding boxes in such a manner as to admit of their having an up-and-down play and lateral adjustment.

Connected to the sliding boxes $a$ are levers $c$, having their bearings in an opening in the brace-plates $d$ of the frame F, and their upper ends working in a slot formed in similar plates $e$, secured in place by latch-plates $f$, hinged to one of the frame sides, and provided with perforations adapted to engage the ends of the levers, a catch, $g$, preventing the latch-plates from rising after the adjustment of the levers. By this arrangement of levers the operator may readily adjust the plow-beams so as to bring the plows or shovels into or away from the plants, as the cultivation may require. The said beams being also pivotally connected to the sliding boxes, the operator is afforded an additional means for properly cultivating the plants according to their growth, some being in a more advanced stage than others, owing to the condition of the soil being dissimilar in different portions of the field.

The plows or shovels G of this cultivator are each provided upon their backs with a hollow cone-shaped projection, $h$, into which fits a conical casting, $i$, secured to the standards H, and provided with a cap, $l$, at its top and screw-rod $m$ at its bottom. This conical casting $i$ is also provided with teeth upon its upper portion, which mesh with similar teeth upon the interior of the cone-shaped projection of the plows or shovels, as shown in detail, Fig. 3, the screw-rod $m$ passing through an opening in the bottom of said projection, and these parts held in relation to each other by a suitable nut working on said screw-rod, the cap $l$ serving to keep out the dirt. The object of this construction is to admit of the plows or shovels being adjusted so as to throw the dirt away from the plants when very weedy, and also to throw the dirt toward the plants in more or less quantities as their cultivation may require, especially in the cultivating of corn. To accomplish this adjustment the operator loosens the nut upon the screw-rod sufficiently to let the plow or shovel and its cone-shaped projection drop, so as to disengage the teeth therein with those of the conical casting on the standard. The plow or shovel is then turned in the direction desired and secured in place by the nut, the engagement of the teeth preventing it from becoming disconnected unless by the action of the operator.

To each standard is secured a projection, $k$, having its front face slotted to admit a brace, I, connected to the beam F, said brace being provided with perforations in its end, which enter the projection, a perforation being also made in the sides of said projection to register therewith, and the two coupled by means of a wooden pin. By having the braces connected to the standards in this manner the plows or shovels may be set at a greater or less angle, and should the point come in contact with an obstruction greater than the resistance of the earth, the wooden pin will break and allow said plow or shovel to fall back, the bolt connecting the standard to the beam acting as a pivot, thus preventing the other parts of the machine from being injured, the pin being readily replaced by another.

Suitable hooks n are connected to the beams, by which they may be held up to raise the plows or shovels off the ground when not desired for use, any suitable number of plows or shovels being connected to each beam.

Having now described my invention, what I claim as new, and desire to secure by Letters Patent, is—

1. The shovel or plow G, having connected thereto the conical hollow castings h, provided upon its interior with suitable teeth, in combination with the conical casting i, connected to the standard H, and having the cap l to exclude the dirt or grit from the hollow conical casting, and teeth upon the under side of the cap, and the screw-rod m, substantially as and for the purpose set forth.

2. The combination, with the beam-frames C, adapted to receive the axles D, of the wheels E, and adjustably connected to the arched tongue-support A, said beam-frames having suitable brace-plates d e, and perforated latch-plates f, substantially as and for the purpose described.

3. The combination, with the sliding boxes a upon the axle D, operated by the levers c, having their bearings in the perforated brace-plates d e, and working in the slotted latch-plate f, of the beam-frames C, said sliding boxes having pivotally connected thereto the plow or shovel beams F, single-tree hooks b being also connected to these sliding boxes and axles, substantially as and for the purpose set forth.

4. The combination, with the beam-frames C, supporting the axles D, and provided with brace-plates d e, and latch-plates f, constructed substantially as described, of the sliding boxes a, operated by levers c, and the pivotally-secured plow or shovel beams, substantially as shown and described.

In testimony that I claim the above I have hereunto subscribed my name in the presence of two witnesses.

JOHN B. ENNIS.

Witnesses:
ADOLPH HACKER,
CHARLS LUNKLY.